US012787122B2

(12) United States Patent
Arlein

(10) Patent No.: US 12,787,122 B2
(45) Date of Patent: Nov. 3, 2026

(54) SYSTEM AND METHOD FOR WAXING EQUIPMENT USING A HANDHELD INFRARED WAXING SYSTEM

(71) Applicant: mountainFLOW eco-wax, LLC, Carbondale, CO (US)

(72) Inventor: Peter Arlein, Carbondale, CO (US)

(73) Assignee: mountainFLOW eco-wax, LLC, Carbondale, CO (US)

( * ) Notice: Subject to any disclaimer, the term of this patent is extended or adjusted under 35 U.S.C. 154(b) by 0 days.

(21) Appl. No.: 18/533,752

(22) Filed: Dec. 8, 2023

(65) Prior Publication Data

US 2024/0196483 A1 Jun. 13, 2024

Related U.S. Application Data

(60) Provisional application No. 63/386,842, filed on Dec. 9, 2022.

(51) Int. Cl.
*H05B 3/00* (2006.01)
*A63C 11/08* (2006.01)

(52) U.S. Cl.
CPC ............ *H05B 3/0038* (2013.01); *A63C 11/08* (2013.01)

(58) Field of Classification Search
CPC .............................. H05B 3/0038; A63C 11/08
See application file for complete search history.

(56) References Cited

U.S. PATENT DOCUMENTS

| | | | | |
|---|---|---|---|---|
| 3,912,902 | A | 10/1975 | Herniter | |
| 2002/0070360 | A1* | 6/2002 | Machi | F21V 29/00 257/E33.073 |
| 2002/0154513 | A1* | 10/2002 | Yagi | B60Q 1/14 362/512 |
| 2004/0042070 | A1* | 3/2004 | Yagi | G02B 19/0028 359/350 |
| 2009/0223512 | A1* | 9/2009 | Konkle | F24C 1/10 126/92 AC |
| 2020/0063970 | A1* | 2/2020 | Toyama | A47J 37/0786 |
| 2020/0103094 | A1* | 4/2020 | Stevenson | F21V 19/001 |
| 2022/0267205 | A1* | 8/2022 | Chien | C03C 3/097 |

FOREIGN PATENT DOCUMENTS

EP 1586355 A1 10/2005

* cited by examiner

*Primary Examiner* — Bryon T Gyllstrom
(74) *Attorney, Agent, or Firm* — Holland & Hart LLP

(57) ABSTRACT

A handheld infrared light for applying wax to a surface of an equipment at atmospheric pressure is provided. The handheld infrared light includes a body defining a lighting cavity, a body width of about 3 inches to about 8 inches, and a body length of about 4 inches to about 11.5 inches. The handheld infrared light also includes at least one light positioned within the lighting cavity. The at least one light includes a bulb having a power output of about 300 watts to about 750 watts.

20 Claims, 4 Drawing Sheets

SYSTEM AND METHOD FOR WAXING EQUIPMENT USING A HANDHELD INFRARED WAXING SYSTEM

CROSS-REFERENCE TO RELATED APPLICATION

This application claims the benefit of U.S. Provisional Patent Application No. 63/386,842, entitled "SYSTEM AND METHOD FOR WAXING EQUIPMENT USING A HANDHELD INFRARED WAXING SYSTEM," filed on Dec. 9, 2022, which is specifically incorporated by reference for all it discloses and teaches.

BACKGROUND OF CERTAIN ASPECTS OF THE DISCLOSURE

A lubricating wax may be applied to a base or other snow-contacting surface of snow equipment intended to glide across snow. The wax improves the glide characteristics of snow equipment bases, particularly and primarily to overcome three types of friction: dry friction, wet friction, and electrostatic friction. Dry friction is caused by snow crystals rubbing against the base of the ski. Wet friction occurs when there is a high percentage of moisture in the snow and is caused by capillaries, or threads of water, that stick to the base of the ski and decrease speed. Electrostatic friction is caused by the electric properties of snow and the snow equipment base. Particularly, as the snow equipment moves through snow, electrons are transferred between the snow and the snow equipment creating an electric field. This electric field resists change such that as the snow equipment moves forward an electric force opposes this movement. The force is proportional to the charge developed between the snow equipment base and the snow and the distance between them. An effective snow equipment wax minimizes the effects of dry friction, wet friction, and electrostatic friction, while still being easily applicable to the snow equipment and having a sufficient durability to stay on the snow equipment over a desired time period or to travel a certain distance through snow. However, IR waxing equipment is typically large, hard to operate, and expensive. As such, commercial establishments are typically the only access many consumers have to waxing equipment. Moreover, commercial IR waxing systems typically apply wax in a vacuum to improve the absorption of wax into the snow equipment. Operating in a vacuum increases the cost of the commercial waxing system and reduces access to the commercial waxing systems outside of commercial establishments.

Accordingly, there is a need for a handheld IR waxing system that can be used by the average consumer at their home.

BRIEF SUMMARY OF SOME ASPECTS OF THE DISCLOSURE

The embodiments described herein includes a handheld infrared light for applying wax to a surface of an equipment at atmospheric pressure. The handheld infrared light includes a body defining a lighting cavity, a body width of about 3 inches to about 8 inches, and a body length of about 4 inches to about 11.5 inches. The handheld infrared light also includes at least one light positioned within the lighting cavity. The at least one light includes a bulb having a power output of about 300 watts to about 750 watts.

A number of embodiments of a waxing system are presented in this application. The embodiments described herein include a handheld infrared light and a wax. The wax is configured to be applied to a surface of an equipment at atmospheric pressure and the handheld infrared light is configured to emit infrared radiation toward the wax and the surface of the equipment to at least partially melt the wax such that the wax is at least partially absorbed into the surface of the equipment.

The embodiments described herein also include a method of waxing equipment using a waxing system. The waxing system includes a handheld infrared light and a wax. The method includes turning on the handheld infrared light. The method further includes heating a surface of the equipment with the handheld infrared light. The method also includes rubbing the wax on the surface of the equipment at atmospheric pressure. The method further includes reheating the surface of the equipment with the handheld infrared light. The method also includes absorbing the wax into the surface of the equipment.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are disclosed in association with the accompanying drawings in which.

DETAILED DESCRIPTION

A number of embodiments of a system and method for waxing equipment using a handheld waxing system. In general, the handheld waxing system includes a handheld heating system and wax. Specifically, the handheld heating system includes a handheld IR (infrared) light configured to be positioned proximate the equipment to melt the wax and the wax typically includes hydrocarbons configured to be applied to the equipment to improve (increase or decrease depending on the type of snow equipment) the coefficient of friction between the equipment and snow. During operations, the wax is positioned on the equipment and the handheld IR light melts the wax while simultaneously heating the equipment such that the wax is at least partially absorbed into the equipment and onto the surface of the equipment. The wax lowers the coefficient of friction between the equipment and snow, enabling the equipment to slide on snow. The wax and the handheld IR light are moved along the equipment such that wax is applied to the snow contacting areas of the equipment. As such, the handheld waxing system described herein enables a user to wax their equipment at home without large and expensive equipment.

Figure 1:
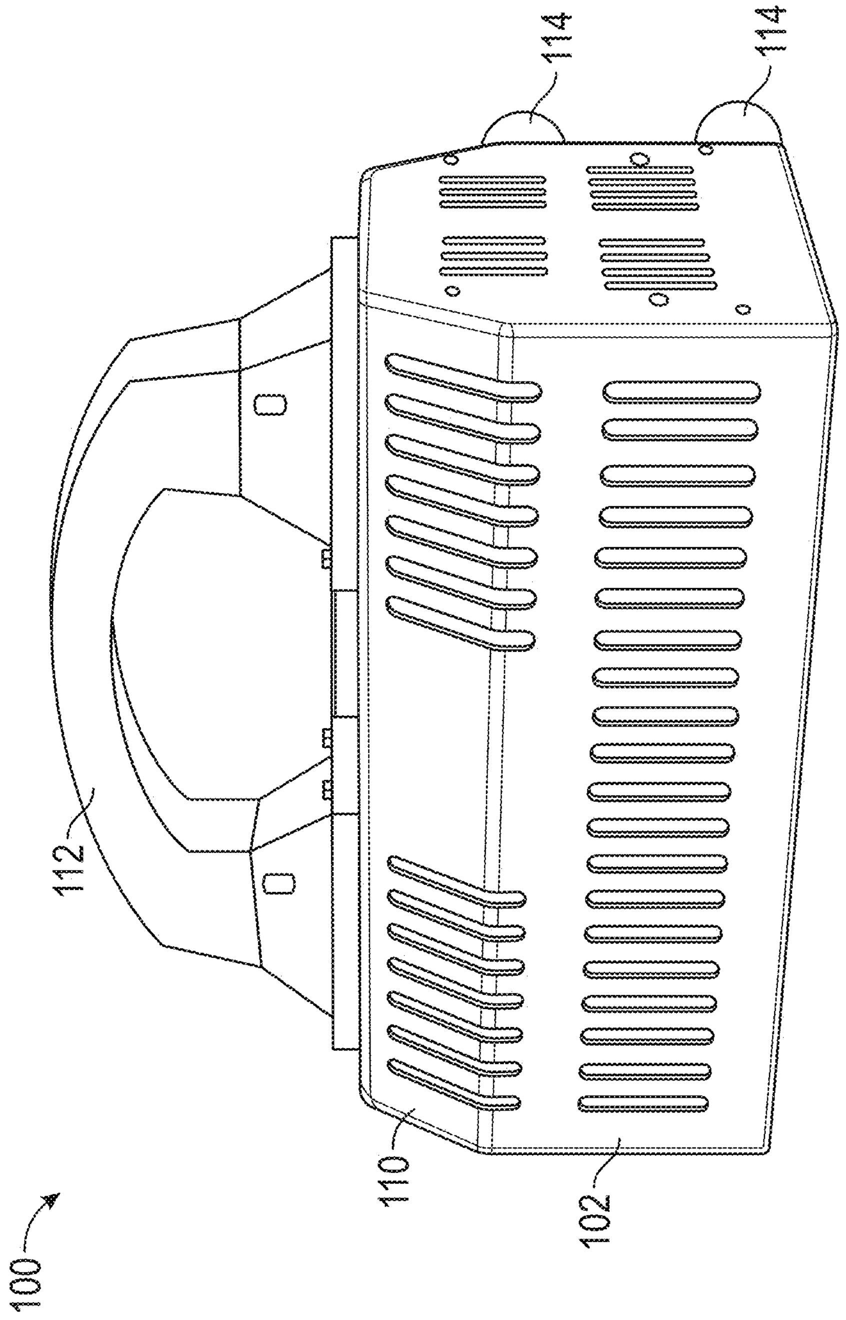
FIG. 1 illustrates a perspective view of a waxing system in accordance with aspects of the present disclosure.
Figure 2:
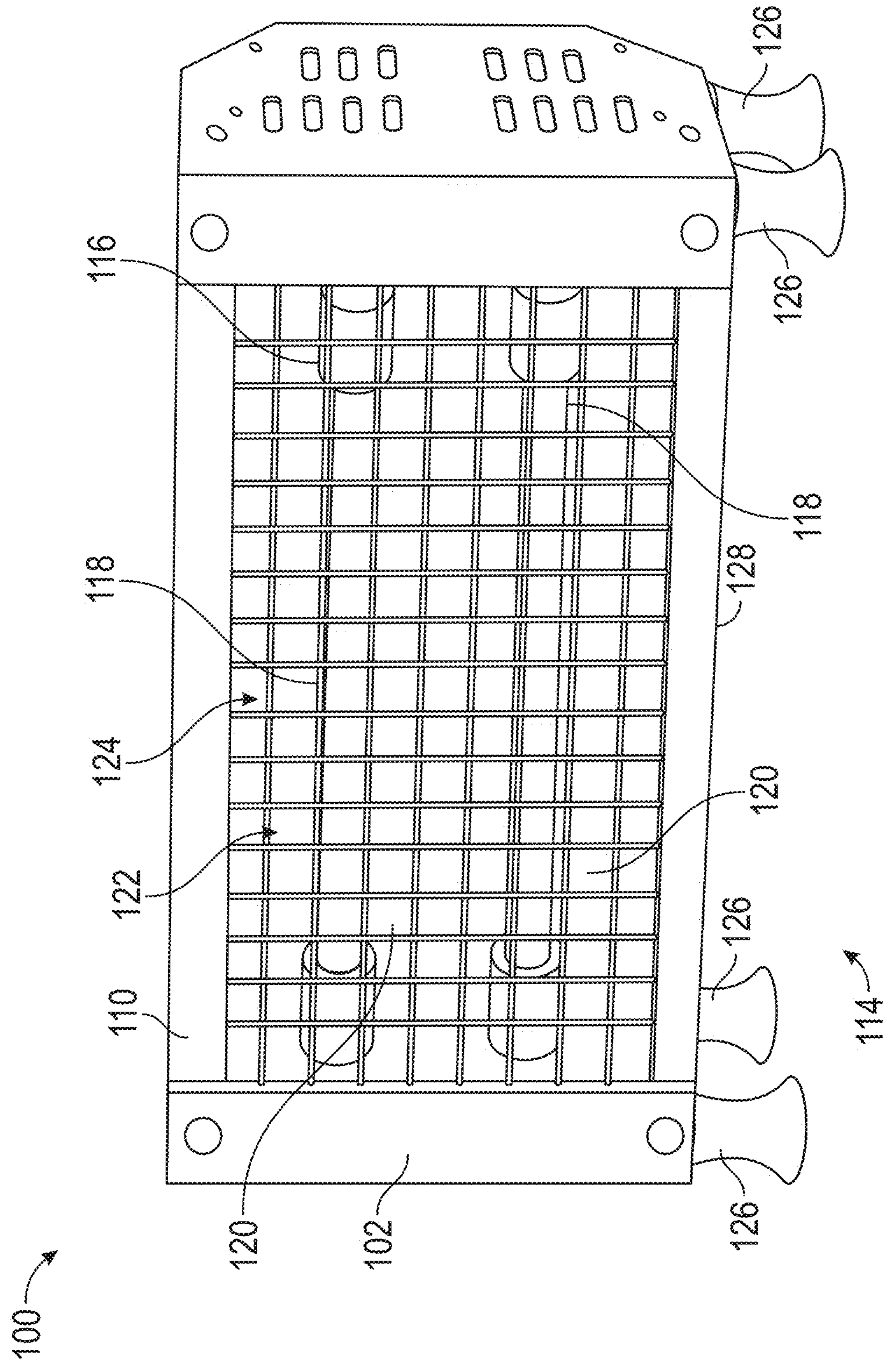
FIG. 2 illustrates another perspective view of the waxing system illustrated in FIG. 1 in accordance with aspects of the present disclosure.
Figure 3:
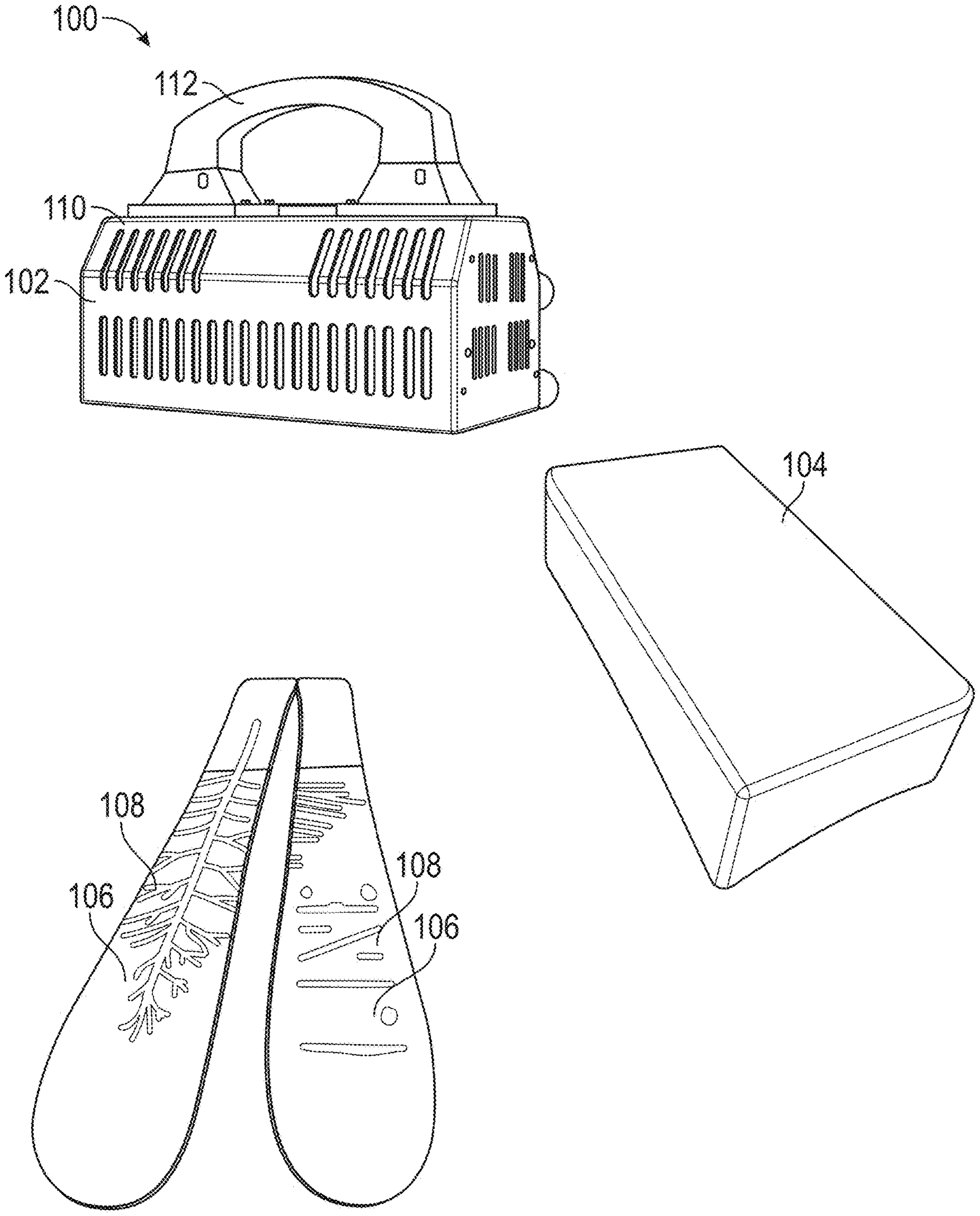
FIG. 3 illustrates a perspective view of the waxing system illustrated in FIG. 1 positioned proximate equipment in accordance with aspects of the present disclosure.

FIG. 1 is a perspective view of a handheld heating system 102 of a waxing system 100. FIG. 2 is another perspective view of the handheld heating system 102 of the waxing system 100. FIG. 3 is a perspective view of the waxing system 100 positioned proximate equipment 106. The waxing system 100 includes the handheld heating system 102 and wax 104 (shown in FIG. 3). In the illustrated embodiment, the handheld heating system 102 includes a handheld IR light 102 configured to be positioned proximate the wax 104 and the equipment 106 to melt the wax 104 and heat the equipment 106 such that the wax 104 is at least partially absorbed into the equipment 106 to reduce the coefficient of friction between a surface or snow contacting area 108 of the equipment 106 and snow.

The handheld IR light 102 includes a body 110, a handle 112, a stand 114, a screen 116, at least one light 118, at least one reflector 120, electronics (not shown), a control system (not shown), and a power source (not shown). In the illustrated embodiment, the body 110 includes a metallic case that defines a lighting cavity 122 and an opening 124. The body 110 is sized and shaped to encapsulate the light 118, the reflector 120, the electronics, the control system, and the power source in the lighting cavity 122. The opening 124 is sized and shaped to enable IR light from the light 118 to be directed from the lighting cavity 122 to the equipment 106. The screen 116 includes a mesh screen, is positioned in the opening 124, and the body 110 and the screen 116 are configured to protect the light 118, the reflector 120, the electronics, the control system, and the power source in the lighting cavity 122.

In the illustrated embodiment, the at least one light 118 includes a plurality of lights 118 positioned within the lighting cavity 122. Specifically, the handheld IR light 102 includes two lights 118. In alternative embodiments, the handheld IR light 102 may include any number of lights 118 that enables the handheld IR light 102 described herein to operate as described herein. The lights 118 include incandescent light bulbs configured to emit infrared radiation. In some embodiments, the incandescent light bulbs include may tungsten filaments heated to high temperature to produce visible light and, necessarily, even more infrared radiation. The incandescent light bulbs may be tinted red to reduce visible light.

In alternative embodiments, the at least one light 118 may include other types of infrared heaters rather than incandescent light bulbs. For example, the other types of infrared heaters may include metal wire heating elements, ceramic infrared heat systems, far-infrared heating systems, quartz heat lamps, quarts tungsten heat lamps, carbon heaters, gas-fired heaters, and/or any other type of heating system. Additionally, the other types of infrared heaters may include near infrared (NIR) or short-wave infrared heaters, Medium-wave infrared (MWIR) heaters, and/or far infrared emitters (FIR).

NIR heaters typically operate at high filament temperatures above 1,800° C. (3,270° F.) and when arranged in a field reach high power densities of some hundreds of kW/m2. Their peak wavelength is well below the absorption spectrum for water, making them unsuitable for many drying applications. They are well suited for heating of silica where a deep penetration is needed. MWIR heaters typically operate at filament temperatures of around 1,000° C. (1,830° F.). They reach maximum power densities of up to 60 kW/m2 (5.6 kW/sq ft) (medium-wave) and 150 kW/m2 (14 kW/sq ft) (carbon). FIR are typically used in low-temperature use such as saunas. Instead of using carbon, quartz or high watt ceramic emitters, which emit near and medium infrared radiation, heat and light, far infrared emitters typically use low watt ceramic plates that remain cold, while still emitting far infrared radiation.

In the illustrated embodiment, the lights 118 are 450-watt bulbs configured to emit peak infrared radiation at wavelength of approximately 690 nanometers to approximately 5050 nanometers. More specifically, the lights 118 are configured to emit peak infrared radiation at wavelength of approximately 1000 nanometers to approximately 3000 nanometers. In the illustrated embodiment, the other IR lights are typically more powerful than the lights 118 in the illustrated embodiment. The lights 118 have a reduced electrical power or wattage to avoid damaging the snow equipment while still melting the wax and heating up the snow contacting surface of the snow equipment such that the wax is absorbed into the snow equipment. The lights 118 include a bulb having a power output of about 300 watts to about 750 watts. In the illustrated embodiment, the bulb is a 450-watt bulb. In alternative embodiments, the bulb may have any power output that enables the handheld IR light 102 to operate as described herein.

The body defines a body width of about 3 inches to about 8 inches and a body length of about 4 inches to about 11.5 inches. The body width and the body length are configured to be wide enough to heat the snow contacting surface of the snow equipment without wasting energy. That is, the body width and the body length are configured to be a width that enables the handheld IR light 102 to heat both skis and snowboards. The body length is configured to be slightly larger than the average width of skis and slightly smaller than the average width of snowboards.

The reflector 120 may include a plurality of reflectors 120 positioned within the lighting cavity 122 configured to reflect IR light out of the opening 124. In the illustrated embodiment, the reflectors 120 may include a mirror or other reflective device that reflects and/or directs IR light out of the opening 124 by continually reflecting the IR light until it exits the body 110 through the opening 124. The reflectors 120 at least partially surround the lights 118 such that a substantial portion of the IR light is directed through the opening 124.

The electronics, the control system, and the power source are positioned within the body 110 and power and control the lights 118. The electronics may include any electronics necessary to control the lights 118. The control system may include an on/off switch, an IR wavelength control, and/or a power control. The power source may include a battery, a power cord, and/or any other power source configured to power the lights 118.

In the illustrated embodiment, the handle 112 is attached to the body 110 and is configured to enable a user to hold the handheld IR light 102. The stand 114 includes a plurality of supports 126 attached to a side 128 of the body 110 configured to support the handheld IR light 102 when not in use. Specifically, in the illustrated embodiment, the supports 126 include four supports 126 attached to the body 110 that support the handheld IR light 102 when the opening 124 is oriented away from a supporting surface such that the surface is not continually heated and damaged when not in use.

As used herein, the term wax means any substance applied to snow equipment to affect, increase, decrease, and/or tune the coefficient of friction between snow and snow equipment. In some embodiments, the wax 104 includes wax. In other embodiments, the wax 104 may include other, non-wax substances such as hydrocarbons, resins, fluorocarbons, and/or any other substance in solid or liquid form applied to snow equipment. The wax 104 may include any type of wax that enables the waxing system 100 to operate as described herein. For example, the wax 104 may include a glide wax and/or a grip wax. A glide wax is typically applied to alpine skis, snowboards, skate skis, classic skis, back-country skis, and/or touring skis. Traditional waxes include hydrocarbons. A grip wax is typically applied to cross-country skis to provide traction with static friction on the snow that allows them to propel themselves forward on flats and up hills. The grip wax typically includes hard wax (a traditionally paraffin wax-based substance with admixtures) and/or klister (a sticky ointment, which may contain a combination of rosins, waxes, solvents and fats).

The wax system 100 enables a user to apply the wax 104 at home without the use of large, expensive waxing systems. More specifically, the waxing system 100 described herein enables the user to apply the wax 104 at atmospheric pressure (not in a vacuum like large commercial wax systems), reducing costs and saving time for the user.

In the illustrated embodiment, the equipment 106 includes skis. In alternative embodiments, the equipment may also include snowboards, skate skis, classic skis, back-country skis, cross-country skis, and/or touring skis. Additionally, the equipment 106 may include any type of equipment that may be waxed. In the illustrated embodiment, the equipment 106 includes a surface 108 to be waxed. Specifically, in the illustrated embodiment, the surface 108 includes a snow-contacting surface to be waxed.

During operation, the equipment 106 (ski or snowboard) is placed onto a table mounted ski vise or tuning stand (not shown). The handheld IR light 102 is turned on and reached an operating temperature within 10 seconds. The handheld IR light 102 is held between 1.5 to 6 inches above the surface 108 of the equipment 106. The handheld IR light 102 is moved slowly from along the surface 108 of the equipment 106. As the surface 108 of the equipment 106 is heated by the handheld IR light 102, a bar of wax 104 is rubbed onto the surface 108 of the equipment 106. After a thin, even coat of wax has been applied to the surface 108 of the equipment 106, the handheld IR light 102 is moved back over the surface 108 of the equipment 106. The wax 104 liquefies and is absorbed into the surface 108 of the equipment 106. This heating and absorption process may take more than one pass with the handheld IR light 102. Once the wax has cooled to room temperature, any extra wax which has not been absorbed into the surface 108 of the equipment 106 will be removed with a wax scraper and/or wax brush (not shown).

Figure 4:
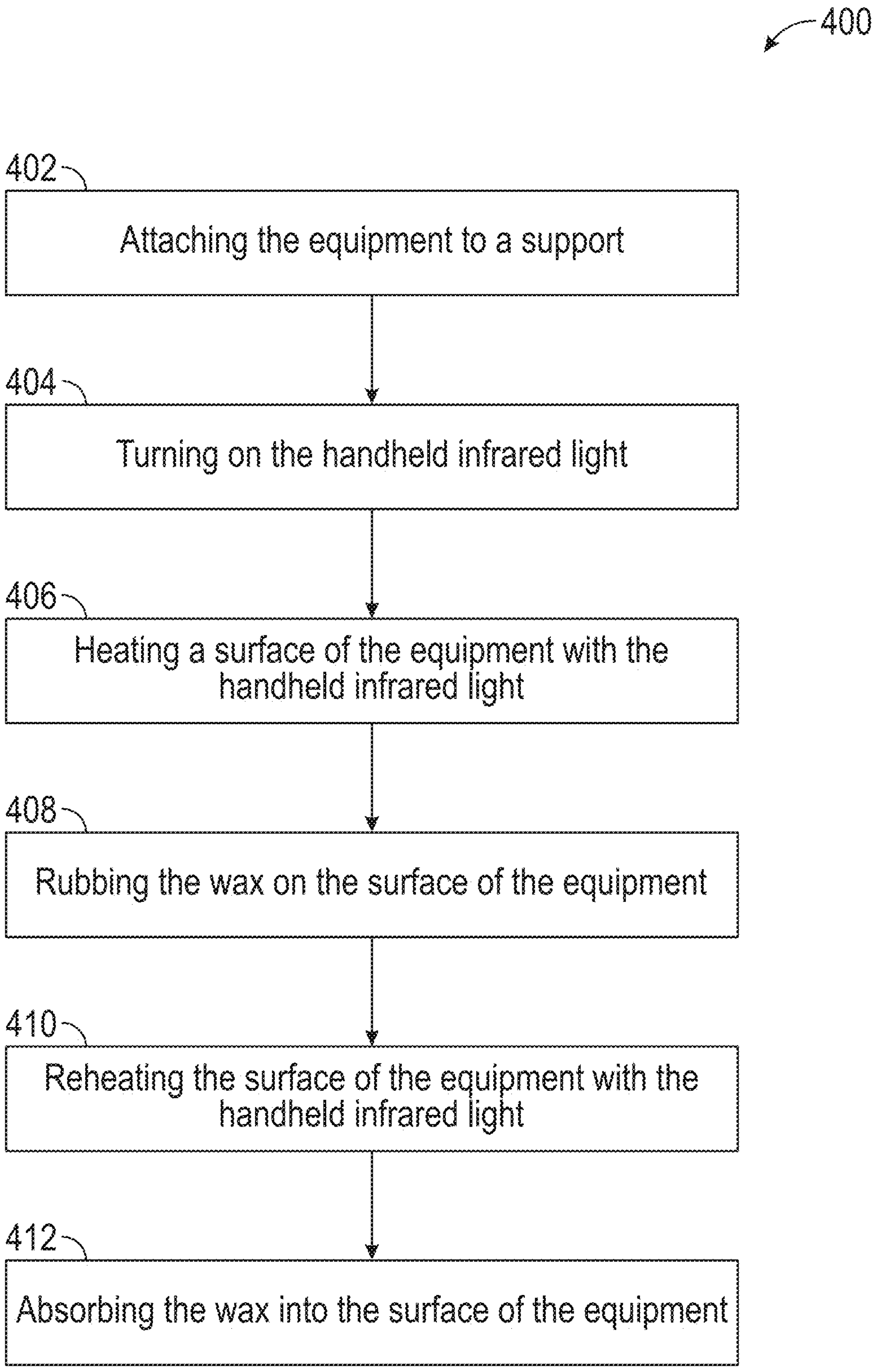
FIG. 4 illustrates a flow diagram of a method of waxing equipment using the waxing system illustrated in FIGS. 1-3 in accordance with aspects of the present disclosure.

FIG. 4 illustrates a flow diagram of a method 400 of waxing equipment using a waxing system. The waxing system includes a handheld infrared light and a wax. The method 400 includes attaching 402 the equipment to a support. The method 400 further includes turning 404 on the handheld infrared light. The method 400 further includes heating 406 a surface of the equipment with the handheld infrared light. The method 400 also includes rubbing 408 the wax on the surface of the equipment. The method 400 further includes reheating 410 the surface of the equipment with the handheld infrared light. The method 400 also includes absorbing 412 the wax into the surface of the equipment.

The embodiments of the system and method for waxing equipment using a handheld waxing system. In general, the handheld waxing system includes a handheld heating system and wax. Specifically, the handheld heating system includes a handheld IR (infrared) light configured to be positioned proximate the equipment to melt the wax and the wax includes hydrocarbons configured to be applied to the equipment to reduce the coefficient of friction between the equipment and snow. During operations, the wax is positioned on the equipment and the handheld IR light melts the wax while simultaneously heating the equipment such that the wax is at least partially absorbed into the equipment and onto the surface of the equipment. The wax lowers or raises the coefficient of friction between the equipment and snow, enabling the equipment to slide on snow. The wax and the handheld IR light are moved along the equipment such that wax is applied to the snow contacting areas of the equipment. As such, the handheld waxing system described herein enables a user to wax their equipment at home without large and expensive equipment.

A typical wax iron, the most common implement for applying glide wax, heats the ski base through conduction and requires direct contact with the ski. Repeated exposure to this type of heat can damage the integrity of the ski and lead to premature ski deterioration. The handheld waxing system described herein heat the ski through radiation and do not require direct contact with the ski. This type of heat transfer, when compared to conduction, reduces structural deterioration of the ski caused through conduction heating. The handheld waxing system described herein requires significantly less wax than what is required through the use of a traditional wax iron. With the handheld waxing system described herein, the wax is rubbed onto the base and then absorbed through the use of infrared radiation. The consistent and even heat that is delivered by the handheld waxing system described herein provides the optimal conditions for wax to be absorbed deep into the base of the ski. This means that there is less residual wax is left on top of the base that will need to be scraped off and discarded. The handheld waxing system described herein makes IR waxing available for the at-home wax user. Additionally, the handheld waxing system described herein has identified the optimal wavelength range to deliver IR wax performance in an affordable and easy-to-use handheld device.

Terminology and Interpretative Conventions

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

What is claimed:

1. A handheld infrared light for melting wax that is applied to a surface of snow equipment at atmospheric pressure, the handheld infrared light comprising:

a body having at least three sides and defining a lighting cavity and an opening;

a handle attached to the body on a side of the at least three sides of the body opposite the opening;

a stand attached to the body, wherein the stand comprises a plurality of supports; and at least one light positioned within the lighting cavity, wherein the at least one light comprises at least one bulb, each having a power output of about 300 watts to about 1,000 watts, wherein a wavelength of a peak infrared radiation emitted by the at least one bulb is from approximately 690 nanometers to approximately 5050 nanometers.

2. The handheld infrared light of claim 1, wherein a wavelength of a peak infrared radiation emitted by the at least one bulb is approximately 750 nanometers to approximately 4960 nanometers.

3. The handheld infrared light of claim 1, wherein the handheld infrared light further comprises a screen positioned within the opening.

4. The handheld infrared light of claim 3, further comprising at least one reflector positioned within the lighting cavity and configured to reflect infrared radiation emitted by the at least one light out of the opening.

5. The handheld infrared light of claim 1, wherein the stand is configured to support the handheld infrared light.

6. The handheld infrared light of claim 1, wherein the plurality of supports are attached to a side of the at least three sides of the body between the handle and the opening.

7. The handheld infrared light of claim 6, wherein the plurality of supports support the handheld infrared light such that the opening is oriented away from a supporting surface.

8. The handheld infrared light of claim 1, wherein the at least one bulb has a power output of about 300 watts to about 750 watts.

9. A handheld infrared light for melting wax that is applied to a surface of snow equipment at atmospheric pressure, the handheld infrared light comprising:

a body defining a lighting cavity and an opening;

a handle attached to the body on a side of the body opposite the opening;

a stand attached to the body; and at least one light positioned within the lighting cavity and comprising a bulb, wherein a wavelength of a peak infrared radiation emitted by the bulb is approximately 690 nanometers to approximately 5050 nanometers, wherein the bulb has a power output of about 300 watts to about 1,000 watts.

10. The handheld infrared light of claim 9, wherein the bulb has a power output of about 300 watts to about 750 watts.

11. The handheld infrared light of claim 9, wherein the body comprises a body width of about 3 inches to about 10 inches and a body length of about 4 inches to about 18 inches.

12. The handheld infrared light of claim 9, wherein a wavelength of a peak infrared radiation emitted by the bulb is approximately 750 nanometers to approximately 4960 nanometers.

13. A handheld infrared light for melting wax that is applied to a surface of snow equipment at atmospheric pressure, the handheld infrared light comprising:

a body having at least three sides and defining a lighting cavity and an opening;

a handle attached to the body on a side of the body opposite the opening;

a stand attached to the body on a side of the body that is different than a side of the body with the handle and a side of the body with the opening; and at least one light positioned within the lighting cavity, wherein the at least one light comprises a bulb having a power output of about 300 watts to about 750 watts, wherein a wavelength of a peak infrared radiation emitted by the bulb is approximately 690 nanometers to approximately 5050 nanometers.

14. The handheld infrared light of claim 13, wherein a wavelength of a peak infrared radiation emitted by the bulb is approximately 750 nanometers to approximately 4960 nanometers.

15. The handheld infrared light of claim 13, wherein the handheld infrared light further comprises a screen positioned within the opening.

16. The handheld infrared light of claim 15, further comprising at least one reflector positioned within the lighting cavity and configured to reflect infrared radiation emitted by the at least one light out of the opening.

17. The handheld infrared light of claim 13, wherein the stand is configured to support the handheld infrared light.

18. The handheld infrared light of claim 17, wherein the stand comprises a plurality of supports attached to a side of the body.

19. The handheld infrared light of claim 18, wherein the plurality of supports support the handheld infrared light such that an opening is oriented away from a supporting surface.

20. The handheld infrared light of claim 13, wherein the body comprises a body width of about 3 inches to about 10 inches and a body length of about 4 inches to about 18 inches.

* * * * *